US012448853B2

(12) United States Patent
Loh et al.

(10) Patent No.: US 12,448,853 B2
(45) Date of Patent: Oct. 21, 2025

(54) WET CONNECT, METHOD, AND SYSTEM

(71) Applicant: Baker Hughes Oilfield Operations LLC, Houston, TX (US)

(72) Inventors: Yuh Loh, Cypress, TX (US); David Bishop, Cypress, TX (US); Marc Samuelson, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 18 days.

(21) Appl. No.: 18/466,477

(22) Filed: Sep. 13, 2023

(65) Prior Publication Data

US 2025/0084708 A1 Mar. 13, 2025

(51) Int. Cl.
*E21B 17/02* (2006.01)
*H01R 13/533* (2006.01)

(52) U.S. Cl.
CPC ........ *E21B 17/0285* (2020.05); *E21B 17/026* (2013.01); *H01R 13/533* (2013.01)

(58) Field of Classification Search
CPC .. E21B 17/023; E21B 17/028; E21B 17/0285; E21B 17/026
See application file for complete search history.

(56) References Cited

U.S. PATENT DOCUMENTS

| | | | |
|---|---|---|---|
| 5,577,925 A | 11/1996 | Schnatzmeyer et al. | |
| 6,390,193 B1 | 5/2002 | Martin et al. | |
| 7,640,977 B2 | 1/2010 | Jonas | |
| 8,496,064 B2 | 7/2013 | Du et al. | |
| 9,546,527 B2 | 1/2017 | Head | |
| 9,753,230 B2 | 9/2017 | Burrow et al. | |
| 10,100,586 B2 | 10/2018 | Tilley et al. | |
| 10,934,785 B2 | 3/2021 | Fripp et al. | |
| 11,193,339 B2 | 12/2021 | El Mallawany | |
| 11,585,161 B2 | 2/2023 | Wetzel | |
| 2003/0211768 A1 | 11/2003 | Cameron et al. | |
| 2009/0321069 A1 | 12/2009 | Jonas | |
| 2018/0363431 A1* | 12/2018 | Crowley | F04D 13/10 |
| 2023/0167694 A1 | 6/2023 | Leismer | |
| 2024/0125183 A1* | 4/2024 | Mahendran | E21B 17/06 |

OTHER PUBLICATIONS

Notification of Transmittal of the International Search Report and the Written Opinion of the International Searching Authority, or the Declaration; PCT/US2024/045558; Mail date: Dec. 17, 2024; 10 pages.

(Continued)

*Primary Examiner* — Kristyn A Hall
(74) *Attorney, Agent, or Firm* — CANTOR COLBURN LLP

(57) ABSTRACT

A wet connect, including a first component having a first signal conductor, a first connector operably connected to the first signal conductor, a second component having a second signal conductor, and a mating connector operably connected to the second signal conductor. A method for wet connecting components including running a second component into connection with a first component without orienting the second component to the first component. A wellbore system, including a borehole in a subsurface formation, a string in the borehole, a wet connect, disposed within or as a part of the string.

17 Claims, 7 Drawing Sheets

(56) References Cited

OTHER PUBLICATIONS

Baker Hughes, Baker Hughes, “SureCONNECT intelligent wet-mate system enabled fullbore multi-fiber optical monitoring in two-trip completion” 2019; 2 pages.

Journal of Petroleum Technology, Journal of Petroleum Technology, “Disconnect Tools Ease Removal of Upper Completion”; Jul. 31, 2013; 5 pages.

* cited by examiner

WET CONNECT, METHOD, AND SYSTEM

BACKGROUND

Wet connects are desirable in the downhole industry for many reasons and have been used for decades. Different styles of wet connects are used for different things but the art is always receptive to new technologies that improve function for particular needs.

SUMMARY

An embodiment of a wet connect, including a first component having a first signal conductor, a first connector operably connected to the first signal conductor, a second component having a second signal conductor, and a mating connector operably connected to the second signal conductor.

An embodiment of a method for wet connecting components including running a second component into connection with a first component without orienting the second component to the first component.

An embodiment of a wellbore system, including a borehole in a subsurface formation, a string in the borehole, a wet connect, disposed within or as a part of the string.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
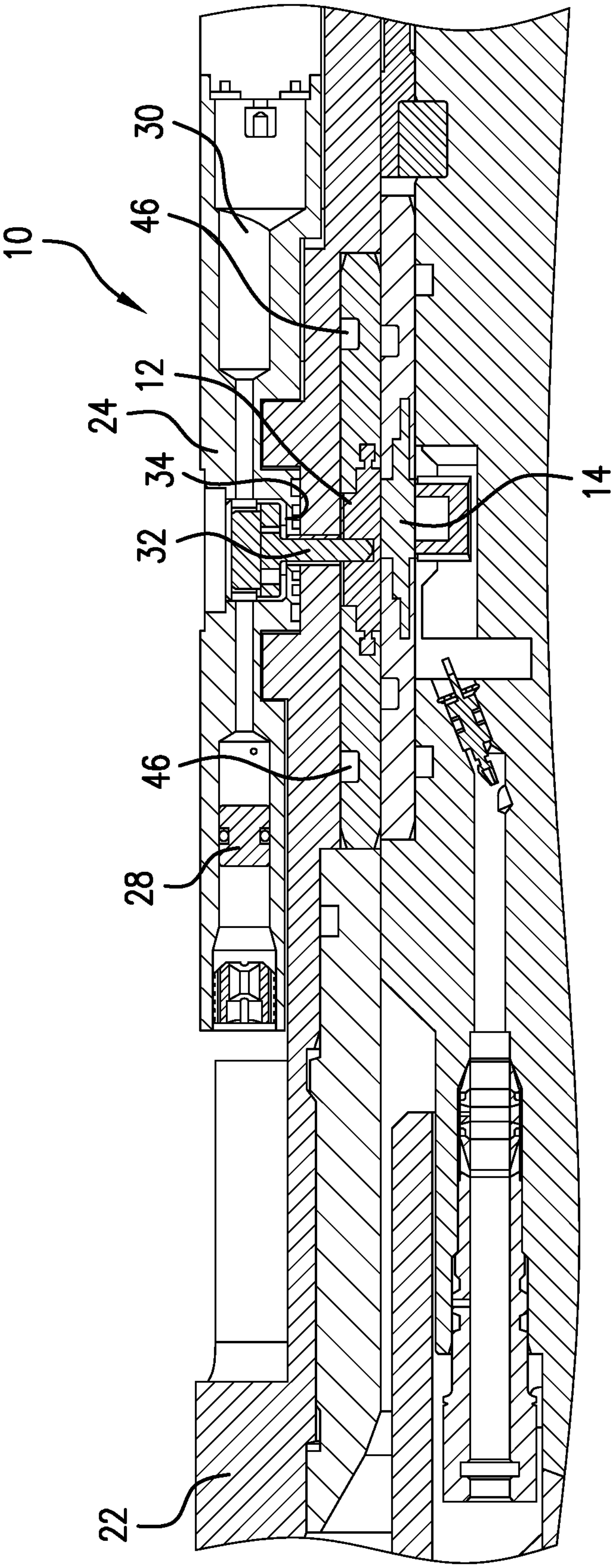
FIG. 1 is a sectional view of an electrical wet connect as disclosed herein in a connected position.
Figure 4:
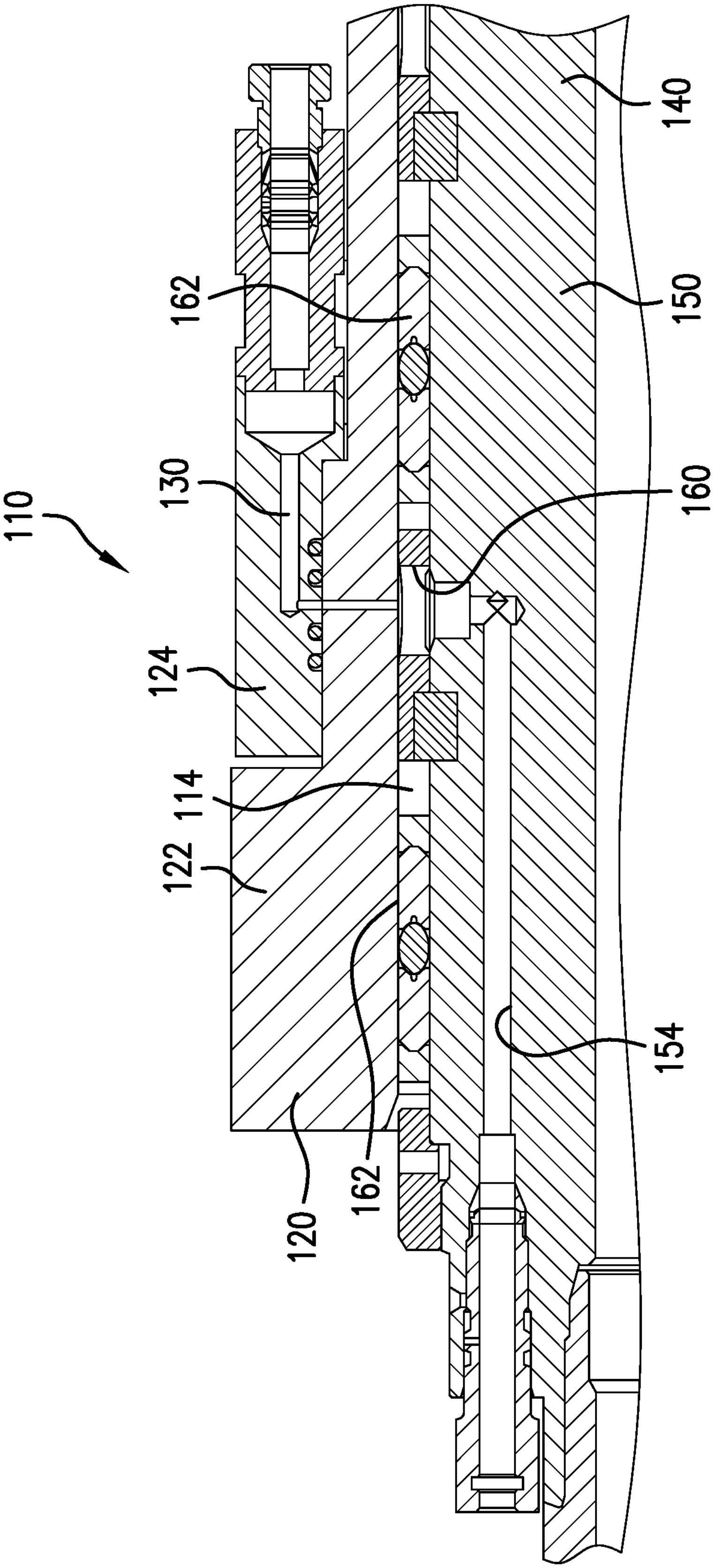
FIG. 4 is a sectional view of a hydraulic wet connect as disclosed herein in a connected position.

Referring to FIGS. 1 and 4, two embodiments of an orientationless wet connect is illustrated. FIG. 1 illustrates an electrical wet connect 10 while FIG. 4 illustrates a hydraulic wet connect 110. By orientationless it is meant that the wet connect 10 does not require any orientation of its components in order to be stabbed together in the downhole environment and make either an electrical or a hydraulic connection (depending upon embodiment). Rather, the wet connect 10/110 employs an annular connector 12 that provides 360 degree connectivity for a mating connector 14/114, which may itself be annular in form. It should be understood that only one of the two connectors 12 and 14/114 must be annular to achieve the goal of orientationless connection, but both may be annular, if desired. In one embodiment, the connection is also concentric.

Figure 2:
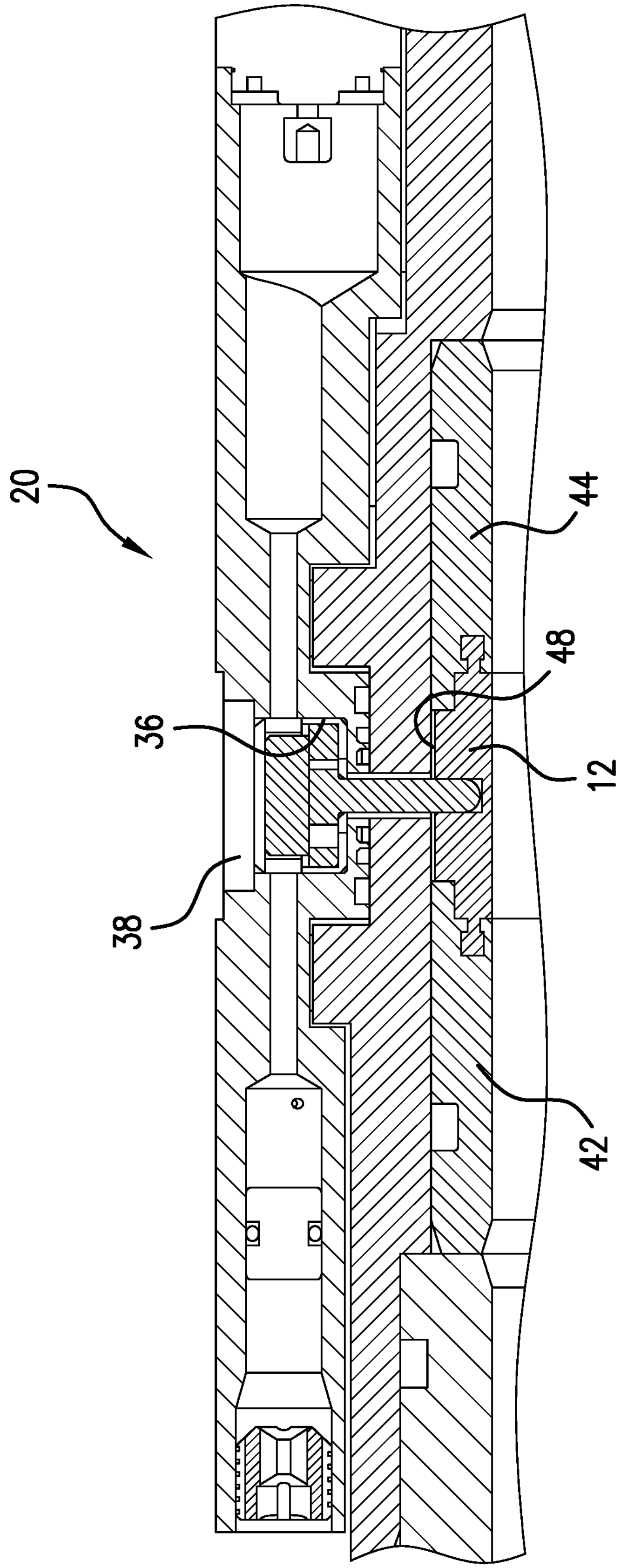
FIG. 2 is a sectional view of a first component of the wet connect.

Referring to FIG. 2, a first component 20 is illustrated for the electrical wet connect 10. The component 20 in one embodiment is a part of a lower completion (LC) that may already be installed in a borehole or may be run into the borehole. In some embodiments, the wet connect 10/110 will be run already connected into the borehole. First component 20 includes a housing 22 that provides structure for a manifold 24. The manifold 24 is in one embodiment pressure compensated with a pressure compensation arrangement 28. Various pressure compensation arrangements are known to the art and do not require specific disclosure. One is as illustrated with a piston that is exposed to annulus pressure on one side and to internal pressure of the manifold 24 on the inside. A first signal conductor 30 is disposed in the manifold 24 and is connected to a radially oriented conductor pin 32. The pin 32 is insulated from the manifold 24, and the housing 22 by an insulator 34. In an embodiment, the pin 32 may be inserted into the manifold 24 and housing 22 radially through an opening 36 in the manifold 24 that is later sealed with a cap 38. The cap 38 may be welded, threaded, etc. to remain in place. Internal to the housing 22 is the annular connector 12 that is in electrical contact with the pin 32. The annular connector 12 is flanked in some embodiments by insulating rings 42 and 44. Rings 42 and 44 may be mechanically attached to the connector 12, or may be overmolded thereon, etc. Seals 46 may be used to ensure downhole fluid does not present infiltration issues. It is to be appreciated that connector 12 is spaced radially inwardly from housing 22 at gap 48 for electrical insulation purposes.

Figure 3:
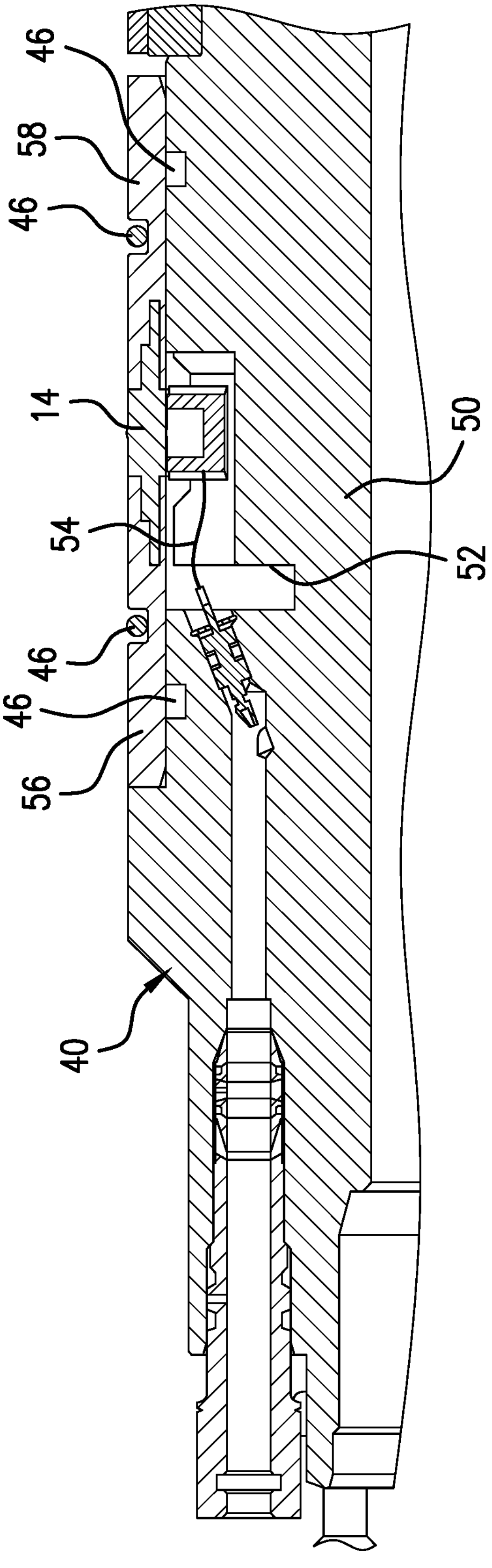
FIG. 3 is a sectional view of a second component of the wet connect.

Referring to FIG. 3, a second component 40 is illustrate for the electrical wet connect 10. Second component 40, in one embodiment is an upper completion (UC). Second component 40 includes a housing 50 including a pressure compensated connection volume 52. Again, pressure compensation is well known to the art and need not be specifically detailed. The connection volume 52 houses a second signal conductor 54 electrically connected to the mating connector 14. Connector 14 may be flanked by insulator rings 56 and 58. Rings 56 and 58 may be mechanically attached to the connector 14, or may be overmolded thereon, etc.

As long as one of the connectors 12 or 14 is annular, no orientation is required to make the connection in the downhole environment.

Referring to FIG. 4, an alternate embodiment is illustrated that makes a hydraulic wet connect as opposed to an electrical wet connect. The various parts are similar to the foregoing electrical embodiment and 100 series numerals of the same numerals used above are employed for brevity. A first component 120 is matable with a second component 140 to make the hydraulic connection. A manifold 124 is disposed on a housing 122 of the first component 120 and supports a first signal conductor 130, which in this case is a control line or similar conveyance for hydraulic fluid. The second component 140 contains a second signal conductor 154, which again for this embodiment is a hydraulic fluid conductor. A connector 114 is disposed radially outwardly of the housing 150 of the second component 140 and provides an opening 160 that will allow fluidic connection between 154 and 130. Seals 162 are provided both to prevent wellbore fluid infiltrating the signal conductors and prevent escape of the hydraulic fluid that is to be the medium for the connection. Essentially, the seals 162 create an annular space between components 120 and 140 in which hydraulic fluid will be resident in order to ensure that the hydraulic fluid will be communicated to both of 154 and 130.

Figure 5:
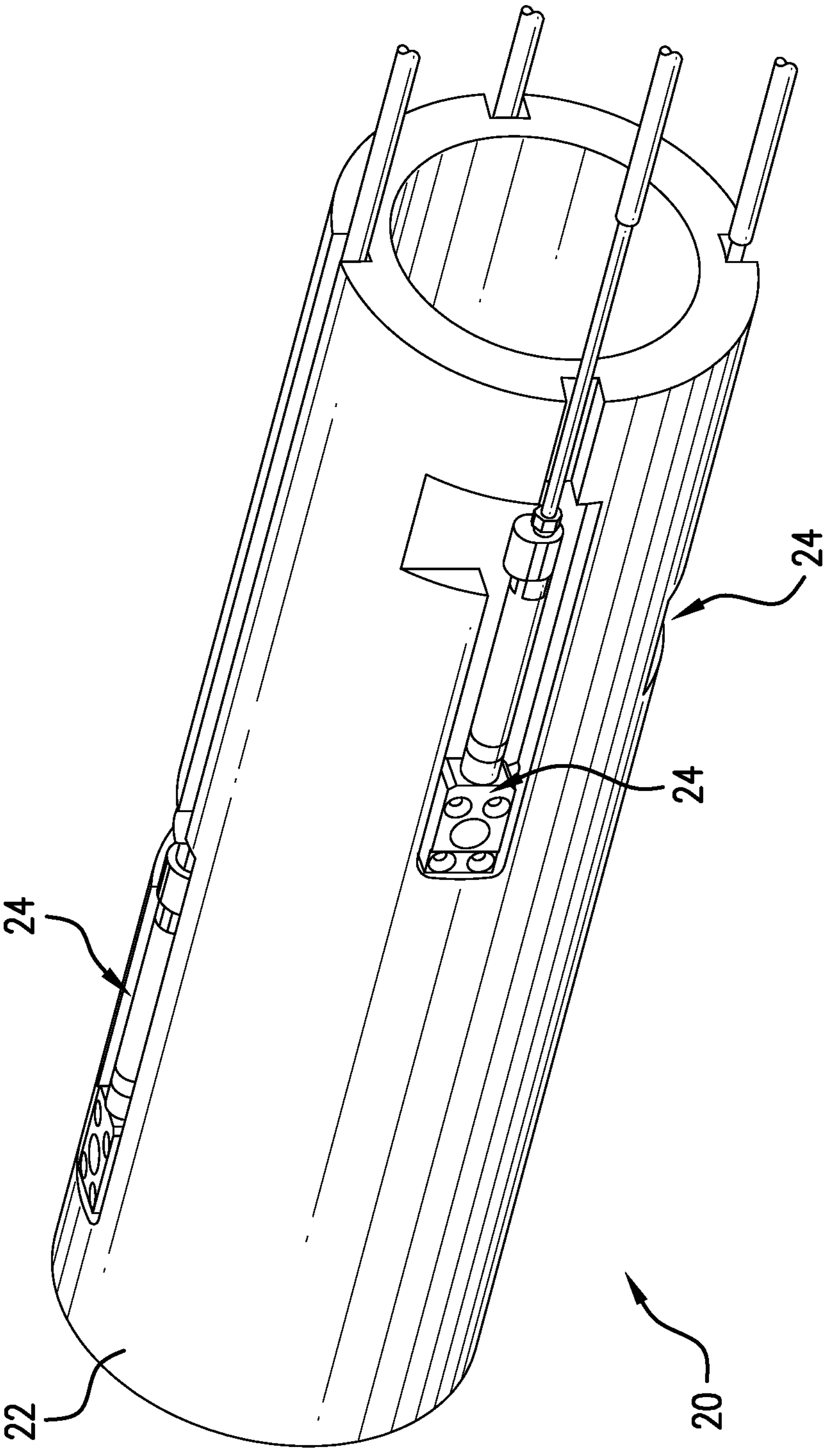
FIG. 5 is a perspective view of an embodiment of electrical wet connect wherein multiple connections are made without orientation.
Figure 6:
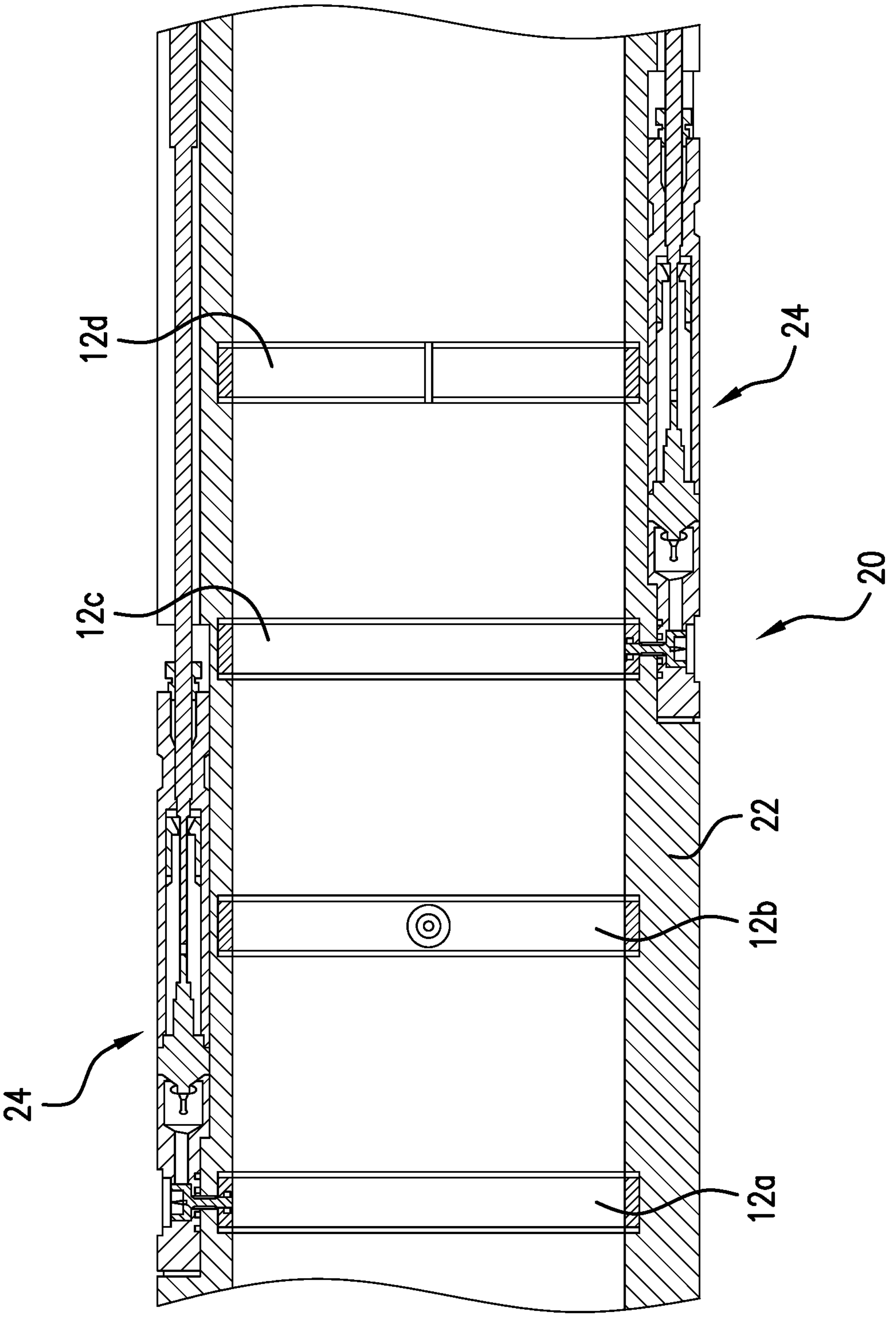
FIG. 6 is a cross sectional view of the embodiment of FIG. 5.

Either of the illustrated embodiments may be configured with one of more connectors. The parts of the components will simply be repeated longitudinally along the completion. In this way, any number of connections can be made in the same way as described above to connect as many conductors as would be desired. For example, referring to FIGS. 5 and 6, a perspective outside view of a first component 20 that illustrated a plurality of manifolds 24 in different axial and different circumferential positions on the housing 22. Each of the manifolds 24 is a different electrical connection point. Referring to FIG. 6, two of the manifolds 24 are visible while the other two, which correspond to the other two connectors 12*b* and 12*d* are disposed at 90 degrees circumferentially of the housing 22 to the manifolds 24 that are visible. With this embodiment 4 connections may be made without orientation. More or fewer are contemplated with more simply requiring additional duplication of the illustrated components and circumferential real estate.

Figure 7:
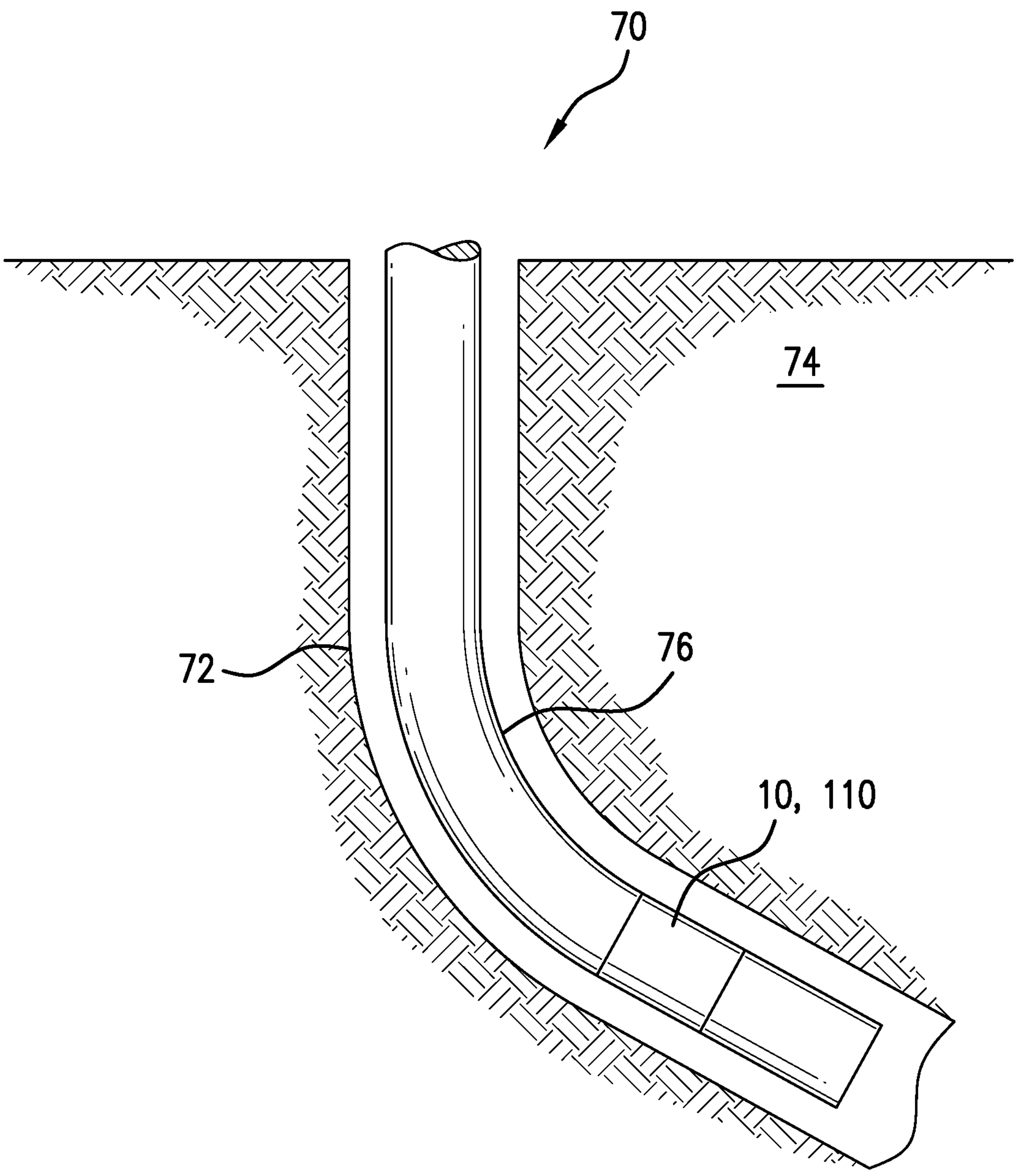
FIG. 7 is a view of a borehole system including the wet connect as disclosed herein.

Referring to FIG. 7, a borehole system 70 is illustrated. The system 70 comprises a borehole 72 in a subsurface formation 74. A string 76 is disposed within the borehole 72. A wet connect 10/110 as disclosed herein is disposed within or as a part of the string 76.

Set forth below are some embodiments of the foregoing disclosure:

Embodiment 1: A wet connect, including a first component having a first signal conductor, a first connector operably connected to the first signal conductor, a second component having a second signal conductor, and a mating connector operably connected to the second signal conductor.

Embodiment 2: The wet connect as in any prior embodiment, wherein the first connector is a plurality of first connectors each electrically connected to a different signal conductor and the mating connector is a plurality of mating connectors each configured to mate with one of the first connectors.

Embodiment 3: The wet connect as in any prior embodiment, wherein the mating connector is annular.

Embodiment 4: The wet connect as in any prior embodiment, wherein the first signal conductor is a hydraulic line.

Embodiment 5: The wet connect as in any prior embodiment, wherein the first signal conductor is an electric line.

Embodiment 6: The wet connect as in any prior embodiment, wherein the wet connect is orientationless.

Embodiment 7: The wet connect as in any prior embodiment, wherein the first connector and the mating connector are concentric.

Embodiment 8: The wet connect as in any prior embodiment, further comprising a manifold.

Embodiment 9: The wet connect as in any prior embodiment, wherein the manifold is pressure compensated.

Embodiment 10: The wet connect as in any prior embodiment, wherein the manifold electrically isolatingly supports a conductor pin.

Embodiment 11: The wet connect as in any prior embodiment, wherein the conductor pin is radially extending.

Embodiment 12: The wet connect as in any prior embodiment, further comprising a manifold of the first component and a manifold of the second component.

Embodiment 13: The wet connect as in any prior embodiment, wherein the first connector includes an electrically conductive portion that is electrically connected to the first signal conductor and electrically isolated from other portions of the first component.

Embodiment 14: The wet connect as in any prior embodiment, wherein the first connector comprises a first ring of insulating material, a ring of conductive material axially adjacent the first ring of insulating material and a second ring of insulating material axially adjacent to the ring of conductive material and spaced from the first ring of insulating material, the first and second rings of insulating material being attached to the ring of conductive material.

Embodiment 15: The wet connect as in any prior embodiment, wherein the first and second rings of material are bonded to the ring of conductive material.

Embodiment 16: The wet connect as in any prior embodiment, wherein the first and second rings of material are mechanically interlocked with the ring of conductive material.

Embodiment 17: The wet connect as in any prior embodiment, wherein the first component is a lower completion (LC).

Embodiment 18: The wet connect as in any prior embodiment, wherein the second component is an upper completion (UC).

Embodiment 19: A method for wet connecting components including running a second component into connection with a first component without orienting the second component to the first component.

Embodiment 20: The method as in any prior embodiment, wherein the running into connection is repeatable interspersed by breaking the connection.

Embodiment 21: A wellbore system, including a borehole in a subsurface formation, a string in the borehole, a wet connect, as in any prior embodiment, disposed within or as a part of the string.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% of a given value.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A wet connect, comprising:

a first component having a first signal conductor;

a first connector operably connected to the first signal conductor, the first connector comprising an electrically conductive portion that is electrically connected to the first signal conductor and electrically isolated from other portions of the first component, the first connector further comprising a first ring of insulating material, a ring of conductive material axially adjacent the first ring of insulating material and a second ring of insulating material axially adjacent to the ring of conductive material and spaced from the first ring of insulating material, the first and second rings of insulating material being attached to the ring of conductive material;

a second component having a second signal conductor; and a mating connector operably connected to the second signal conductor.

2. The wet connect as claimed in claim 1, wherein the first connector is a plurality of first connectors each electrically connected to a different signal conductor and the mating connector is a plurality of mating connectors each configured to mate with one of the first connectors.

3. The wet connect as claimed in claim 1, wherein the mating connector is annular.

4. The wet connect as claimed in claim 1, wherein the first signal conductor is an electric line.

5. The wet connect as claimed in claim 1, wherein the wet connect is orientationless.

6. The wet connect as claimed in claim 1, wherein the first connector and the mating connector are concentric.

7. The wet connect as claimed in claim 1, further comprising a manifold.

8. The wet connect as claimed in claim 7, wherein the manifold is pressure compensated.

9. The wet connect as claimed in claim 7, wherein the manifold electrically isolatingly supports a conductor pin.

10. The wet connect as claimed in claim 9, wherein the conductor pin is radially extending.

11. The wet connect as claimed in claim 1, further comprising a manifold of the first component and a manifold of the second component.

12. The wet connect as claimed in claim 1, wherein the first and second rings of material are bonded to the ring of conductive material.

13. The wet connect as claimed in claim 1, wherein the first and second rings of material are mechanically interlocked with the ring of conductive material.

14. The wet connect as claimed in claim 1, wherein the first component is a lower completion (LC).

15. The wet connect as claimed in claim 1, wherein the second component is an upper completion (UC).

16. A wellbore system, comprising:

a borehole in a subsurface formation;

a string in the borehole;

a wet connect, as claimed in claim 1, disposed within or as a part of the string.

17. A wet connect, comprising:

a first component having a first signal conductor in a manifold that electrically isolatingly supports a conductor pin;

a first connector operably connected to the first signal conductor;

a second component having a second signal conductor; and a mating connector operably connected to the second signal conductor.

* * * * *